United States Patent [19]

Mizokami et al.

[11] Patent Number: 5,182,740
[45] Date of Patent: Jan. 26, 1993

[54] METHOD AND APPARATUS FOR CORRECTLY STORING DATA RECORDED ON A ROTATIONAL DISC-SHAPED RECORDING MEDIUM DESPITE OCCURRENCE OF CLOCK SYNCHRONIZATION DISORDER

[75] Inventors: Takuya Mizokami; Shinichi Arai, both of Odawara, Japan

[73] Assignee: Hitachi, Ltd., Tokyo, Japan

[21] Appl. No.: 755,819

[22] Filed: Sep. 6, 1991

Related U.S. Application Data

[63] Continuation-in-part of Ser. No. 656,946, Feb. 19, 1991.

[30] Foreign Application Priority Data

Sep. 20, 1990 [JP] Japan .................. 2-248799

[51] Int. Cl.[5] .............. G11B 5/09; G11B 15/52; G11B 20/10; G11B 27/22
[52] U.S. Cl. .................... 369/47; 369/100; 369/111
[58] Field of Search ............ 369/47, 32, 48, 49, 369/50, 51, 54, 58, 124, 112, 111, 100; 360/51

[56] References Cited

U.S. PATENT DOCUMENTS

| | | | |
|---|---|---|---|
| 4,631,714 | 12/1986 | Kahlman et al. | 369/47 |
| 4,719,611 | 1/1988 | Miura et al. | 369/47 |
| 4,750,059 | 6/1988 | Syracuse | 369/50 |
| 4,918,677 | 4/1990 | Ashinuma et al. | 369/32 |
| 4,969,139 | 11/1990 | Azumatani et al. | 369/47 |
| 4,984,096 | 1/1991 | Kim | 369/47 |
| 5,054,017 | 10/1991 | Hiroyoshi et al. | 369/47 |
| 5,058,089 | 10/1991 | Yoshimaru et al. | 369/47 |

Primary Examiner—Tommy P. Chin
Assistant Examiner—Thai Tran
Attorney, Agent, or Firm—Kenyon & Kenyon

[57] ABSTRACT

This invention is intended for MCAV-based information processing which records and/or reproduces data. A disc-shaped recording medium having a record area formed in a plurality of concentric tracks is rotated at a constant angular velocity, the record area is partitioned into a plurality of zones depending on the radial position, base clock frequencies are assigned to the zones so that an outer zone has a higher clock frequency than an inner zone, and data is recorded and reproduced in each zone in accordance with the base clock of the assigned frequency. In recording and reproducing data, a VFO signal recorded together with the unit block data of recording and reproduction (sector) is reproduced thereby to produce a VFO clock which is synchronous with the reproduced VFO signal by means of a phase lock circuit (VFO), and, in introducing reproduced data which follows the VFO signal into the reproduced data introduction circuit, synchronization disorder (sync-disorder) of the VFO clock is detected. At detection of sync-disorder, reproduced data corresponding to recorded data following the data in the sector with the event of sync-disorder is introduced to the reproduced data introduction circuit in response to the VFO clock which is synchronous with the VFO signal recorded together with the recorded data, despite the sync-disorder.

20 Claims, 7 Drawing Sheets

METHOD AND APPARATUS FOR CORRECTLY STORING DATA RECORDED ON A ROTATIONAL DISC-SHAPED RECORDING MEDIUM DESPITE OCCURRENCE OF CLOCK SYNCHRONIZATION DISORDER

BACKGROUND OF THE INVENTION

This is a Continuation-In-Part application of Ser. No. 07/656,946 filed on Feb. 19, 1991, the disclosure of which is hereby incorporated by reference.

This invention relates to a recording and reproduction apparatus based on a rotational disc-shaped recording medium such as an optical disk or magnetic disk. More particularly, this invention relates to a method of introducing data from a recording and reproduction apparatus of the MCAV (Modified Constant Angular Velocity) scheme, in which data is recorded and reproduced by changing or varying the clock frequency (the base frequency for the recording and/or reproducing operation) depending on the radial position on the recording medium where the data is to be recorded or reproduced, and a recording and reproduction apparatus and an optical disk apparatus based on the method.

A recording and reproduction apparatus using a rotational recording medium such as an optical disk or magnetic disk is known to be based on the MCAV scheme. For example, an optical disk apparatus based on the MCAV scheme is described in JP-A-262271. The MCAV scheme is designed to divide the recording area of an optical disk into several annulus-shaped zones, with an outer zone having a higher base frequency for recording and reproduction than an inner zone, so that the disk has an increased recording capacity. The details of the MCAV scheme will be explained later based on FIGS. 1 and 2.

In recording or reproducing data on the recording medium, data needs to be recorded or reproduced in accordance with the base frequency of recording and-/or reproduction. Reproduced data needs to be introduced to an introduction circuit (such a memory as a read data buffer). On this account, a variable frequency oscillator (VFO) signal, which indicates the rate of data recording, reproduction and introduction, is recorded on the recording medium together with data in each sector which is the unit area of data recording and reproduction.

At data reproduction, a VFO circuit (phase lock circuit) produces a VFO clock signal which is synchronous with the VFO signal, and reproduced data in each sector is separated and introduced in accordance with the VFO clock signal.

In the MCAV-based apparatus, the recording and reproduction base frequency can have a two-fold or more variation between the innermost zone and the outermost zone of the disc-shaped recording medium. In the event of a dropout or deterioration of the reproduced signal (particularly, the reproduced VFO signal) due to the presence of a defect or dust on the recording medium, the VFO circuit develops a clock disorder. In the worst case, the VFO clock frequency can be twice or more, or half or less than the normal recording and reproduction base frequency. In order for the phase lock circuit (VFO circuit) to be synchronous with the reproduced signal (reproduced VFO signal) which lies in such a wide frequency range, it must have a wide pull-in range, however, this property is contradictory against the requirement of smaller deviation in its output clock (VFO clock).

SUMMARY OF THE INVENTION

An object of this invention, which is intended for a MCAV-based recording and reproduction apparatus which records and/or reproduces data by changing or varying the base clock frequency for the recording/reproduction operation depending on the radial position on the recording medium, is to introduce reproduced data in unit blocks of recording and reproduction (sector) into the introduction circuit (such a memory as a read data buffer) by using a VFO clock which is synchronous with the reproduced signal of a VFO signal recorded together with data and by preventing, in the event of VFO clock disorder, abnormal introduction of not only data in the sector with the event of clock disorder, but also data in successive sectors.

If the VFO (variable frequency oscillator) circuit which operates in synchronism with the reproduced VFO signal malfunctions, causing the resulting VFO clock frequency to fall for example, the rate of data introduction to the data introduction circuit (such a memory as a read data buffer) decreases and all data in one sector cannot be introduced before data introduction for the next sector begins (because the data storage location (address) of the read data buffer is incremented by the VFO clock), and therefore data of the next sector is loaded in incorrect locations in the read data buffer. Consequently, data in successive sectors cannot be introduced correctly.

If, on the other hand, the VFO clock frequency rises, the read data buffer has its address (ADRS) incremented for one sector (depending on the VFO clock) before the end of data in one sector. Address up-counting suspends at this time point, and it resumes at the next sector (the time point of the DETSYNC signal, which will be explained later). If the VFO clock frequency exceeds the operating frequencies of the read data buffer and associated address up-count circuit, erroneous address count will result or data reading will develop a parity error, causing the subsequent data process to be halted.

Accordingly, this invention is derived from the revelation of problems related to the synchronization disorder (will be termed "sync-disorder") of the VFO clock, which are particularly serious in a MCAV-based recording and reproduction apparatus in which the base clock frequency for data recording and/or reproduction is changed or varied in a wide range depending on the radial position on the recording medium. The VFO clock sync-disorder is a serious matter since it affects not only data in the unit recording/reproduction area (sector) with the event of sync-disorder, but also data in successive sectors.

In the inventive MCAV-based data recording and reproduction on a rotational disc-shaped recording medium having a record area formed in a plurality of concentric tracks, the recording medium is rotated at a constant angular velocity, the record area is partitioned into a plurality of zones depending on the radial position, clock frequencies are assigned to the zones so that an outer zone has a higher clock frequency than an inner zone, and data is recorded and reproduced in unit blocks of recording and reproduction (sectors) in each zone in accordance with the assigned clock frequency. The inventive method is characterized in reproducing the VFO signal which has been recorded together with data in each sector, operating on the VFO circuit (phase lock circuit) to produce a VFO clock for each sector in synchronism with the reproduced VFO signal, and detecting VFO clock sync-disorder at the introduction of reproduced data, which follows the VFO signal, into the reproduced data introduction circuit (such a memory as a read data buffer) based on the VFO clock. The method may propose that, at detection of sync-disorder, in introducing reproduced data for data, which is recorded in the sector next to the sector with the event of sync-disorder, into the reproduced data introduction circuit (such a memory as a read data buffer) in response to the VFO clock which is synchronous with the VFO signal recorded together with the recorded data.

This invention may propose that, if VFO clock sync-disorder is detected, the data introduction clock (the address up-count clock for the read data buffer) for reproduced data in the sector with the event of sync-disorder is switched to the base recording/reproduction clock, so that address up-counting for the read data buffer takes place normally for the sector with sync-disorder despite the VFO clock sync-disorder, thereby preventing the introduction of reproduced data in the following sectors from being affected by the VFO clock sync-disorder.

This invention may further propose that, if VFO clock sync-disorder is detected, introduction of reproduced data in the sector with the event of sync-disorder into the reproduced data introduction circuit (such a memory as a read data buffer) is suspended (address up-counting is halted), and reproduced data corresponding to data, which is recorded in the sector next to the sector with the event of sync-disorder, is introduced into the reproduced data introduction circuit (such a memory as a read data buffer) in response to the VFO clock which is synchronous with the VFO signal recorded together with the recorded data, thereby preventing the introduction of reproduced data in successive sectors from being affected by the VFO sync-disorder.

According to this invention, it is possible to prevent the VFO clock sync-disorder from affecting the introduction of reproduced data in the successive sectors, and the reproduced data in the successive sectors can be introduced to the reproduced data introduction circuit correctly.

U.S. Pat. No. 4,611,314 offers the technique of "read after write (RAW)" in which an alternate record area is provided for each track in an area different from the data record area where data is recorded on a track, e.g., in the innermost or outermost section of the data record area or at the successive area of data record area on each track, and data is tested for error detection at recording into the data record area and, in the event of error detection, the data is recorded into the alternate area. The present invention is particularly effective when combined with the "read after write (RAW)" scheme. Namely, according to still another feature of this invention, the method uses a recording medium having an alternate record area provided in correspondence to each track separately from the data record area on each track, records data in the data record area, verifies the recorded data, and, if the VFO clock sync-disorder is detected at the detection of error in the data recorded in the data record area, records data in the sector with the event of sync-disorder into the alternate record area. The method implements data writing or testing for the written data on the next track during the time of verification access to the data recorded in the alternate record area. Based on this feature, data in the sector with the event of VFO clock sync-disorder is recorded in the alternate record area, and the number of sectors in which VFO abnormalities will occur at reproduction can be reduced, whereby the number of sectors with the possibility of data error can be reduced significantly and the reliability of data reproduction can be enhanced.

Other advantages of this invention will become apparent to persons skilled in this field of art from the following detailed description of the preferred embodiments.

BRIEF DESCRIPTION OF THE DRAWINGS

The invention will be described in connection with the accompanying drawings that are solely intended for the illustration of preferred embodiments, of which.

DESCRIPTION OF THE PREFERRED EMBODIMENTS

Figure 1:
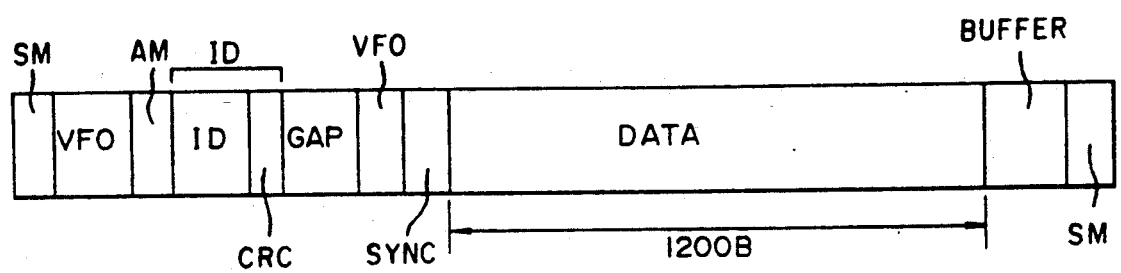
FIG. 1 is a diagram showing, as an example, the format of the data record sector on the optical disk.
Figure 2:
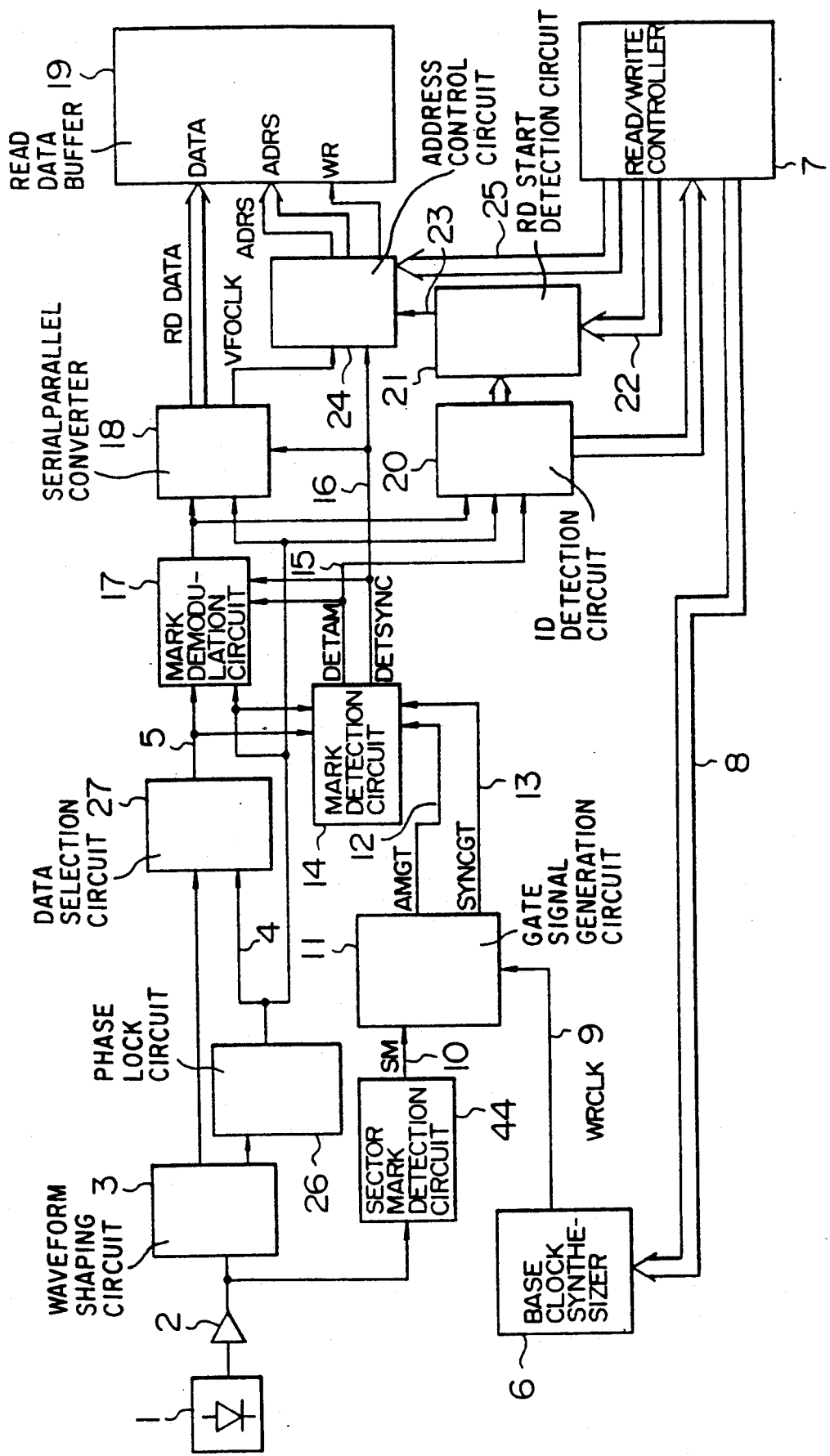
FIG. 2 is a block diagram of the reproduction circuit of a MCAV-based optical disk apparatus.

Initially, FIG. 1 and FIG. 2 will be referenced for the explanation of the reproducing operation of the optical disk apparatus as an example of MCAV-based recording and reproduction apparatus. FIG. 2 shows the reproduction circuit system of the optical disk recording apparatus, and FIG. 1 shows an example of the format of the data record sector on the optical disk (recording medium).

In the recording and reproduction apparatus based on the MCAV (Modified Constant Angular Velocity) scheme, a disc-shaped recording medium having a record area formed in a plurality of concentric tracks is rotated at a constant angular velocity, the record area is partitioned into a plurality of zones depending on the radial position, clock frequencies are assigned to the zones so that an outer zone has a higher clock frequency than an inner zone, and data is recorded and reproduced in each zone in accordance with the assigned clock frequency. Accordingly, the disc-shaped recording medium based on the MCAV scheme has its tracks formatted to have a plurality of zones each made up of multiple tracks. The number of sectors is constant within the same zone, but it increases as the radial position moves from an inner zone to an outer zone. A MCAV-based recording and reproduction apparatus is described in U.S. patent application Ser. No. 07/656,946. The disclosure of the above-mentioned U.S. patent application is incorporated by reference for the detailed arrangement of the overall apparatus and the format of tracks on the recording medium. The following explains the arrangement of the reproduction circuit system and the format of sectors on the recording medium.

In FIG. 1, indicated by SM is a sector mark, AM is an address mark, ID is identification information such as the track address and sector number, CRC is a cyclic redundancy code, SYNC is a sync signal, VFO is a certain code pattern signal for producing a clock in synchronism with the reproduced signal (in 8-byte length or 12-byte length for example), and DATA is data of 1200 bytes for example.

In the sector format shown in FIG. 1, items from SM to CRC are generally preformatted, and the VFO, SYNC and DATA are recorded in addition by being spaced with a GAP which absorbs a shift on the time axis. Item BUFFER placed between DATA and SM of the next sector is to absorb a shift on the time axis, as GAP does. The SM which indicates the head of sector may be omitted.

As illustrated in FIG. 2, a signal sensor 1 provided in the optical head has its reproduction output fed to a pre-amplifier 2, and the resulting output is supplied to a waveform shaping circuit 3 and sector mark detection circuit 44. The waveform shaping circuit 3 converts its input into a bi-level signal, and delivers the output to a phase lock circuit (e.g., VFO circuit or Variable Frequency Oscillator) 26. The VFO circuit 26 produces a VFOCLK signal (clock used by VFO) 4 which is in-phase with the change in the input signal (reproduced version of the VFO signal shown in FIG. 1).

A data selection circuit 27 extracts data based on the VFOCLK 4 thereby to deliver a read data signal (RDDATA) 5.

A base clock synthesizer 6 produces a base clock signal for recording and reproduction (read/write clock, WRCLK) 9 in accordance with the clock frequency command 8 issued by a read/write controller 7. The WRCLK signal 9 has its frequency switched in correspondence to the rate of data reproduction in each zone of the disc-shaped recording medium. The sector mark detection circuit 44 produces the SM (sector mark) signal 10 in response to the detection of the special pattern code at the head of the sector. A gate signal generation circuit 11 counts the WRCLK 9 to produce an AMGT (address mark detection gate) signal 12 and SYNCGT (sync mark detection gate) 13 from the SM signal 10. A mark detection circuit 14 produces a DETAM signal 15 (indicative of the detection of address mark) in response to the detection of the address mark pattern during the period of AMGT and also produces a DETSYNC signal 16 (indicative of the detection of sync pattern) in response to the detection of the SYNC pattern during the period of SYNCGT. A demodulation circuit (e.g., 2-7 demodulation circuit) 17 implements byte synchronization for demodulating the RDDATA signal 5 based on the DETAM signal 15 or DETSYNC signal 16. A serial-to-parallel conversion circuit 18 converts the demodulated serial data into a word of 8 bits plus 1 parity bit, and delivers the word data to a memory (read data buffer memory) 19 for holding reproduced data.

An ID detection circuit 20 holds the demodulated data following the entry of the DETAM signal, implements the CRC check (cyclic redundancy check) for the ID section, and delivers the ID value to the read/write controller 7 and RD start detection circuit 21. The read start detection circuit 21 receives the read start address 22 from the read/write controller 7, and, if the address matches with the output of the ID detection circuit 20, supplies a RDSTART signal (read start signal) 23 to an address control circuit 24.

The address control circuit 24 receives the starting address of the read data buffer (START ADRS) and the amount of transferred data (in bytes) from the read/write controller 7 over a line 25 and, following the entry of the DSTART signal, generates data write signals WR while incrementing the address (ADRS) of the read data buffer 19 in response to the VFO clock so that data is loaded into the read data buffer 19.

In the MCAV operation, the data reproduction rate (reproducing frequency) can differ by twice or more between the innermost zone and outermost zone on the disk, and accordingly the frequency of base clock WRCLK 9 can vary by twice or more. On this account, in the event of a faulty reproduction signal due to the presence of a defect or dust on the recording medium at reproduction and a consequent malfunctioning of the phase lock circuit (VFO circuit) 26, the VFOCLK 4 can be twice or more, or half or less with respect to the base clock frequency. The data introducing operation of the cases, with the VFOCLK frequency being shifted up and down due to the malfunctioning VFO circuit 26, will be explained with reference to FIG. 3.

Figure 3:
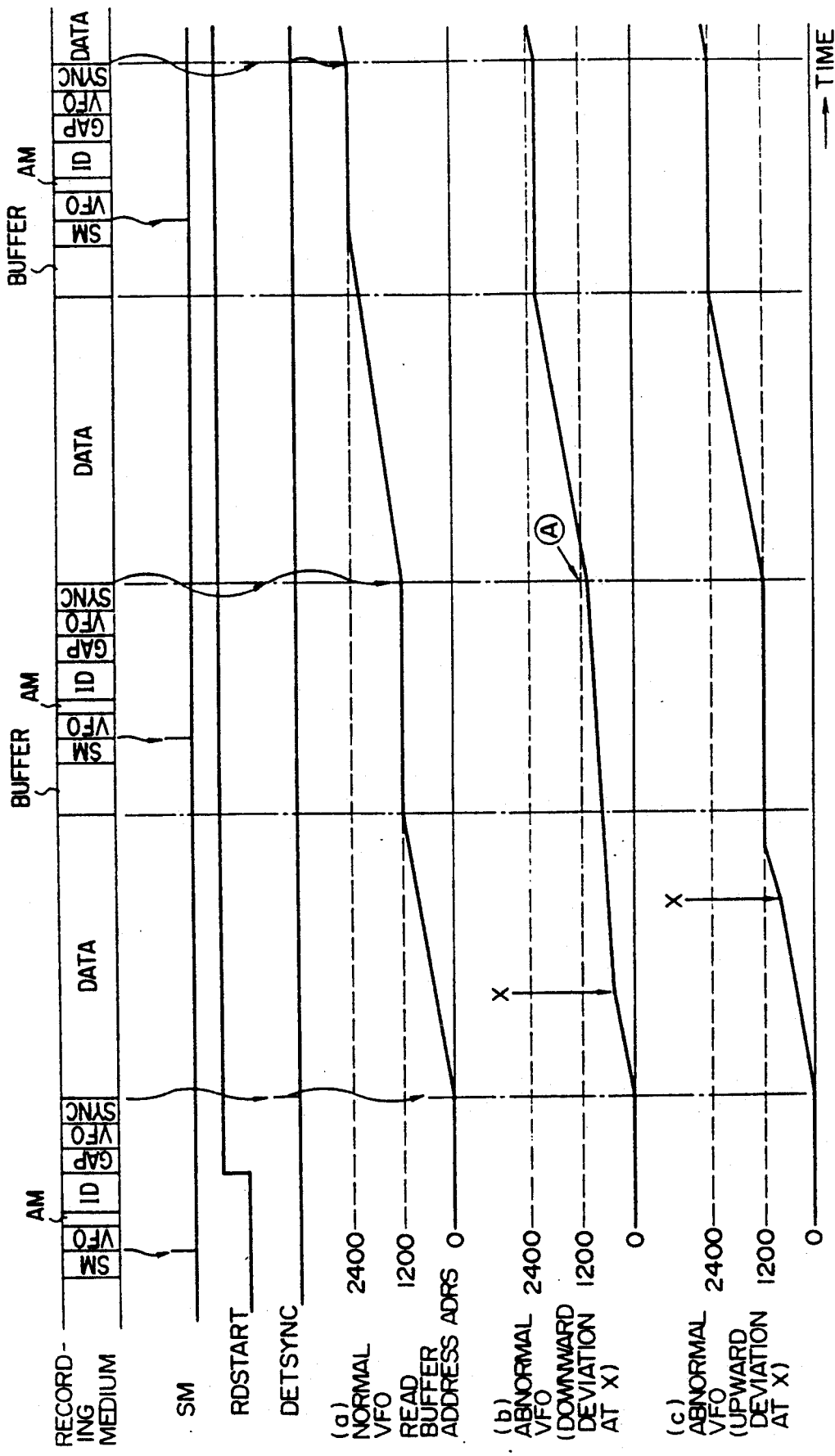
FIG. 3 is a diagram used to explain the operation of the arrangement shown in FIG. 2.

In the case of the normal VFOCLK, the read data buffer address (ADRS) has an initial value of "0", and address up-counting starts in response to the DETSYNC 16 following the activation of RDSTART 23, as shown by (a) in FIG. 3. After the count has reached a prescribed value, e.g., 1200 bytes, within the sector, up-counting halts, and it resumes at the DETSYNC of the next sector.

If the VFOCLK deviates to a lower frequency at a time point X, the count rate slows down and up-counting for one sector (1200 bytes) does not complete before the time point A when data introduction for the next sector starts, as shown by (b) in FIG. 3, and data of the next sector is loaded into incorrect locations of the read data buffer. The downward VFOCLK deviation does not signify a lowered reproduction rate from the disc-shaped recording medium, but instead signals for one sector (1200 bytes) are reproduced at the end of the period of a sector. The data selection circuit 27 can select only data for the count of the downward deviating VFOCLK, and therefore the address 1200 of the read data buffer is not reached and consequently data of successive sectors are loaded, with their addresses being shifted, in the read data buffer. Accordingly, data is not introduced correctly not only for the sector with the event of VFO malfunction, but for all successive sectors.

If the VFOCLK deviates to a higher frequency, up-counting of ADRS completes before the end of the data section, and it resumes at DETSYNC of the next sector, as shown by (c) in FIG. 3. In the event of VFOCLK disorder in excess of the operating frequencies of the address up-count circuit and read data buffer memory, it will incur mis-counting of ADRS or parity error of introduced data, causing the subsequent data processing to be aborted.

Figure 4:
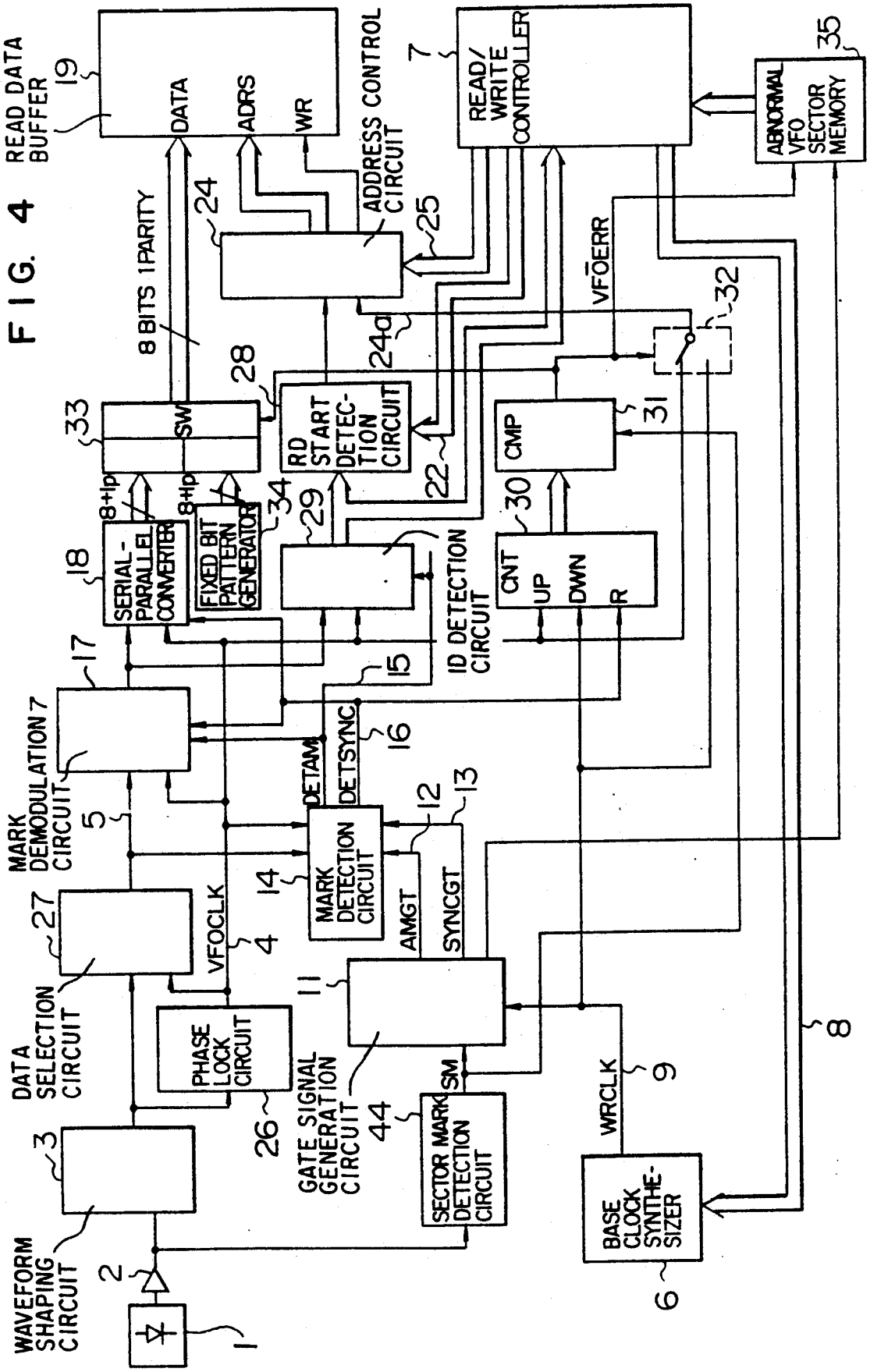
FIG. 4 is a block diagram of the reproduction circuit of the MCAV-based optical disk apparatus based on an embodiment of this invention.
Figure 5:
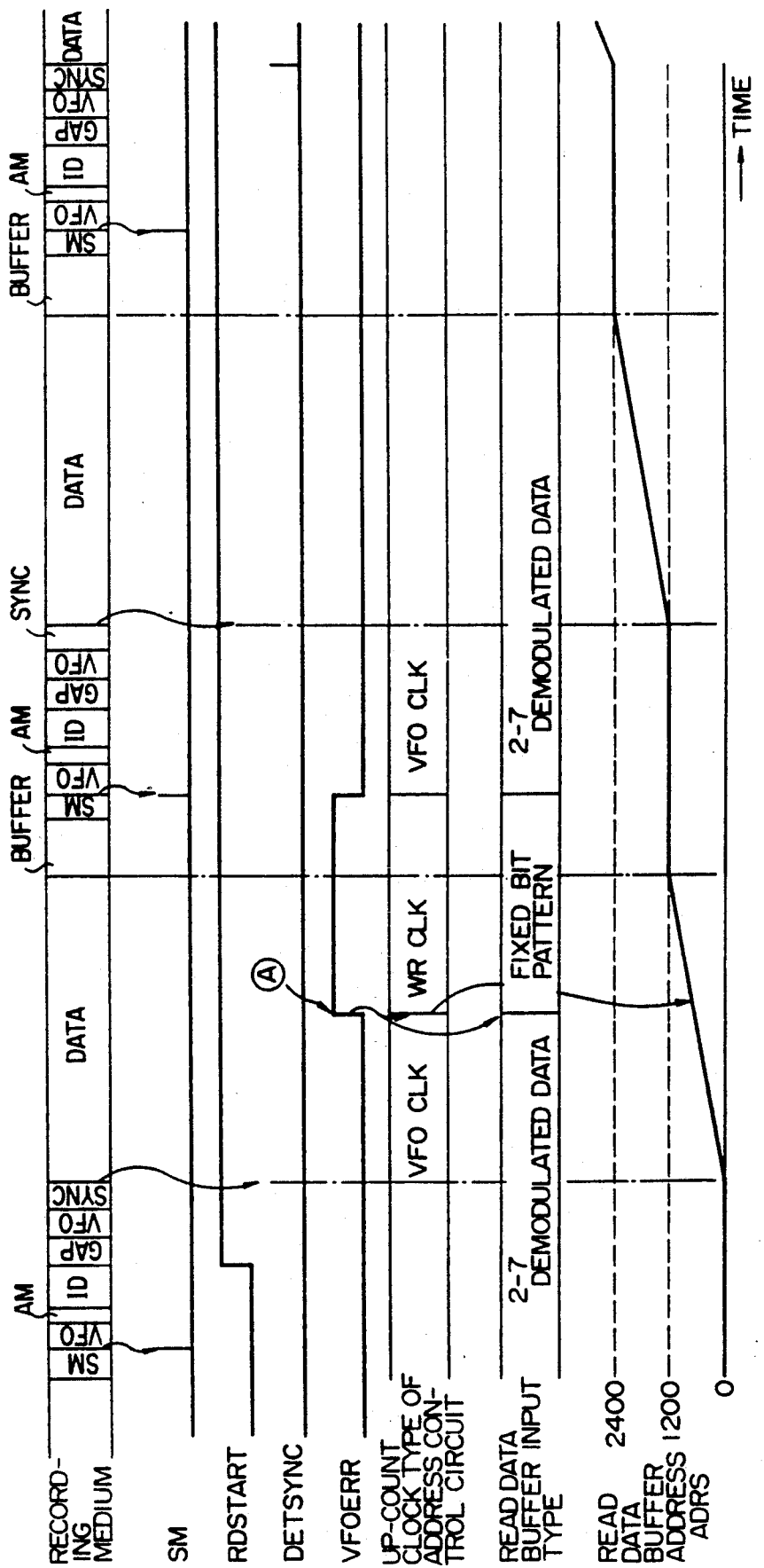
FIG. 5 is a diagram used to explain the operation of the arrangement shown in FIG. 4.

FIG. 4 is a block diagram of the reproduction circuit of the MCAV-based optical disk apparatus based on an embodiment of this invention. In the figure, portions identical to those of FIG. 2 are referred to by the common symbols, with explanation thereof being omitted. The arrangement of FIG. 4 differs from FIG. 2 in the addition of the following circuits.

(1) An up/down counter 30 counts the differential count between the VFO clock (VFOCLK) 4 and the base clock WRCLK 9 since the beginning of data introduction, with its UP, DWN and reset terminals being supplied with VFOCLK, WRCLK and DETSYNC, respectively.

(2) A comparison circuit 31 detects the output of the up/down counter 30 in excess of a prescribed value, e.g., plus or minus 80 counts, to produce a VFOERR (VFO error) signal indicative of VFO sync-disorder and holds the signal until the arrival of the next SM signal.

(3) A switch 32 normally selects the VFOCLK or selects the WRCLK in response to the VFOERR signal for the clock to be fed to the up-count clock terminal 24a of the address control circuit 24.

(4) A switch 33 switches the data input of the read data buffer 19 to a fixed bit pattern data (8 bits plus parity bit) in response to the VFOERR signal so that the timing of the clock is retained.

(5) A fixed bit pattern generator 34 produces a bit string of 8 bits plus parity bit "111111111" (odd parity).

(6) A memory 35 receives the result of VFO test from the comparison circuit 31 and holds the sector with the emergence of VFO error with a sector identification (e.g., relative address).

Next, the operation of this embodiment (FIG. 4) at the occurrence of VFO abnormality will be explained.

It is assumed that the VFOCLK 4 deviates to a lower frequency at a time point A, and a VFOERR is generated. The VFOERR operates the switch 32 so that it switches the address up-count clock from VFOCLK 4 to WRCLK 9 and switches the input data of the read data buffer 19 from the reproduced data to the fixed bit pattern data. Consequently, the specified amount of data of a sector (e.g., 1200 bytes) can be introduced before the arrival of the next sector, and data without parity error can be loaded into the read data buffer memory 19.

At the emergence of VFOERR in the read-after-write mode, the sector of VFO error can be determined from the VFO abnormality memory 35, and data of that sector is held in the alternate area. For the details of the read-after-write function, refer to U.S. Pat. No. 4,611,314.

Figure 6:
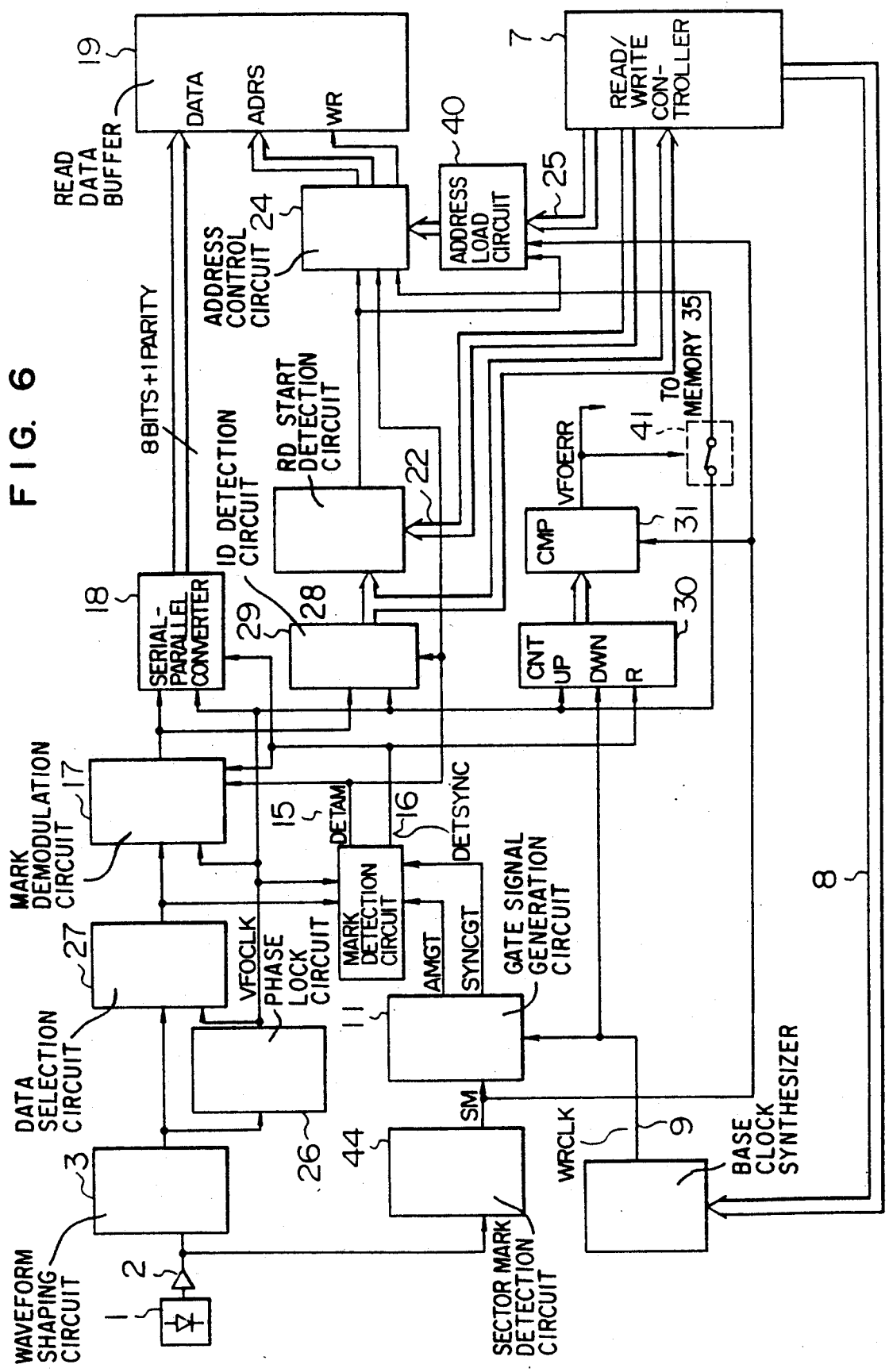
FIG. 6 is a block diagram of the reproduction circuit of the MCAV-based optical disk apparatus based on another embodiment of this invention.

Next, another embodiment of this invention will be described with reference to FIG. 6.

In the figure, portions identical to those of FIG. 3 are referred to by the common symbols, with explanation thereof being omitted. The arrangement of this embodiment differs from FIG. 3 in the addition of the following circuits.

(1) An up/down counter 30 and a comparison circuit 31 are identical to those described previously.

(2) An address loading circuit 40 receives the start address and the number of transfer bytes from the read/write control circuit 7 over the line 25, and sets the starting address to the address control circuit 24 to transfer data of one sector (1200 bytes). During the active RDSTART (provided by the RD start detection circuit 28), the start address to be set to the address control circuit 24 is incremented by 1200 at each event of SM signal so that 1200-byte data of one sector is transferred.

(3) A switch 41 cuts off the VFOCLK to the up-count clock terminal of the address control circuit 24 in the event of VFOERR.

Figure 7:
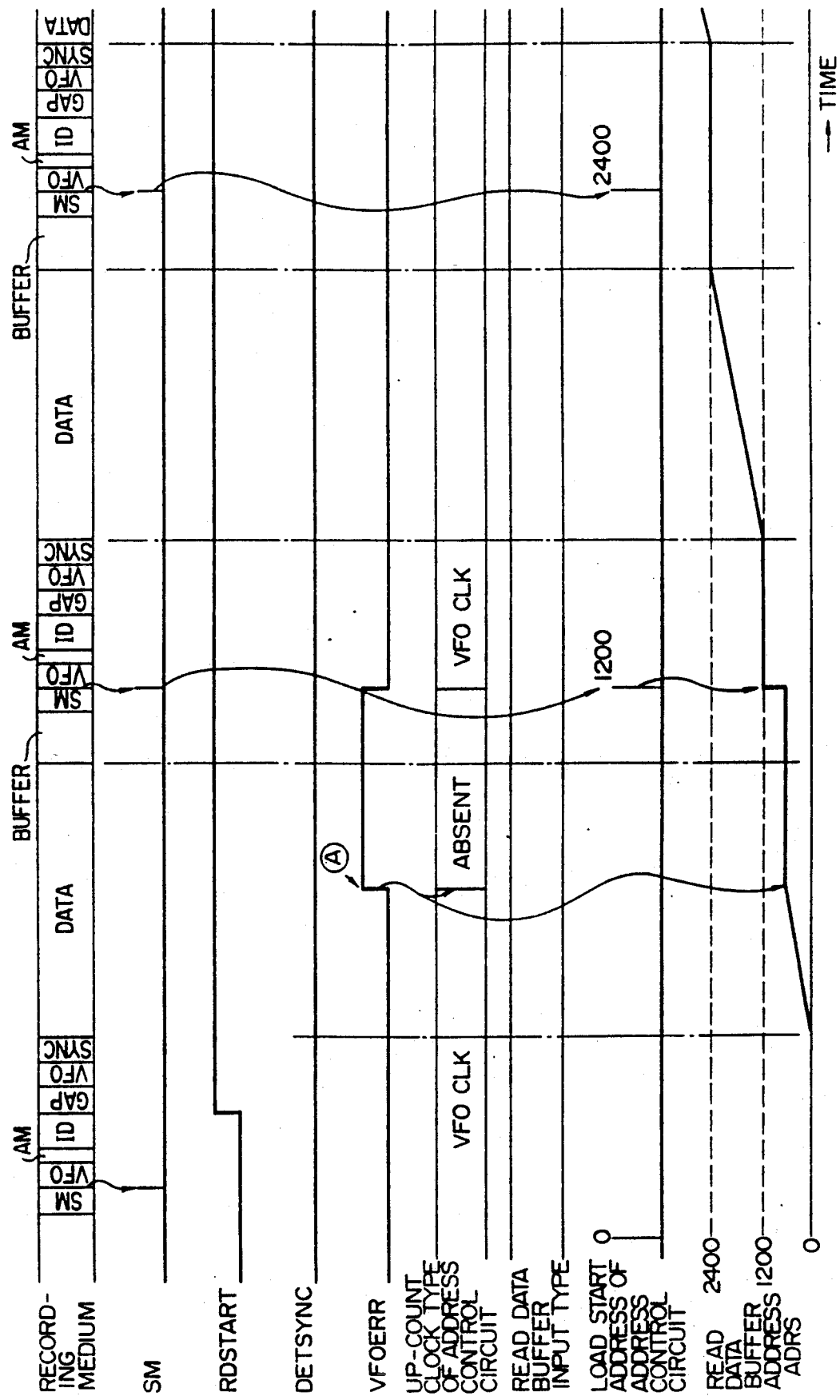
FIG. 7 is a diagram used to explain the operation of the arrangement shown in FIG. 6.

Next, the operation of this embodiment (FIG. 6) at the occurrence of VFO abnormality will be explained in reference to FIG. 7.

It is assumed that the VFOCLK deviates to a lower frequency at a time point A, and a VFOERR is generated. The VFOERR operates the switch 41 to cut off the up-count clock to the address control circuit 24, and address up-counting halts. At the detection of the SM signal of the next sector, the data start position of the next sector data has the value which is set by the address load circuit 40 (1200 in this case) regardless of the point (A) of VFOERR generation in the previous sector. Consequently, when a VFOERR emerges in one sector, only data of that sector is defective and data of successive sectors can be introduced normally without being shifted.

According to this invention, as described above in detail, if the VFO clock deviates during data reproduction, the reproduced data introducing clock is switched to the base clock or introduction of data in the sector with the event of sync-disorder is halted, whereby data of successive record sectors can be loaded in correct locations in the reproduced data introduction circuit, and the subsequent process for these record sectors can proceed without being suspended.

We claim:

1. A method of data introduction in which a disc-shaped recording medium having a record area formed in a plurality of tracks is rotated at a constant angular velocity, the record area is partitioned into a plurality of zones depending on the radial position, with base clock frequencies being assigned to the zones so that an outer zone has a higher frequency than an inner zone, and blocks of data are recorded or reproduced in each zone in accordance with the base clock of the assigned frequency, comprising the steps of:

reproducing from the recording medium blocks of data and a corresponding variable frequency oscillator (VFO) signal for each block of data which have been recorded on the recording medium;

producing a VFO clock signal for each data block in synchronism with the reproduced VFO signal corresponding to that data block;

detecting synchronization disorder ("sync-disorder") of the VFO clock which occurs during storing of a block of said reproduced data into a reproduced data memory in response to the VFO clock signal; and storing, in the event of detection of sync-disorder, reproduced data corresponding to recorded data reproduced subsequent to the block of data which was reproduced during a detected sync-disorder to the reproduced data memory in response to the VFO clock signal despite the detected sync-disorder.

2. A data introduction method according to claim 1, wherein, at detection of sync-disorder of the VFO clock, a data introducing clock of addressing said reproduced data memory during storing of the reproduced block of data which was reproduced during a detected sync-disorder is switched from the VFO clock to the base clock and the block of data reproduced during sync-disorder is stored, despite the detected sync-disorder of the VFO clock.

3. A data introduction method according to claim 1, wherein, at detection of a VFO clock sync-disorder, storing of the block of data reproduced during sync-disorder into the reproduced data memory is suspended, and a block of data reproduced subsequent to the block of data reproduced during sync-disorder is stored in a prescribed location of the reproduced data memory.

4. A data introduction method according to claim 1, wherein a difference in number of clock pulses between the VFO clock and the base clock since the beginning of storing of reproduced data is monitored for each block of data and sync-disorder of the VFO clock is detected based on difference in number of clock pulses.

5. A data introduction method according to claim 1, wherein said disc-shaped recording medium comprises a recording medium having an alternate record area which is provided for each track in an area different from a data record area for data that is recorded on each track, and wherein data recorded in said data record area is checked for error and, at detection of sync-disorder of the VFO clock, a block of data reproduced during detection of a sync-disorder is recorded in said alternate record area.

6. A data introduction method according to claim 5, wherein, during an access wait time for checking data recorded in said alternate record area, data write check for a next track or data read check after writing is carried out.

7. A data introduction method according to claim 1, wherein, at detection of sync-disorder of the VFO clock, data of a prescribed bit pattern is introduced in place of the block of data reproduced during the sync-disorder of the VFO clock.

8. A data introduction method according to claim 7, wherein said prescribed bit pattern data includes a parity bit.

9. An information processing apparatus in which
a disc-shaped recording medium is rotated at a constant angular velocity, the recording medium having a record area formed in a plurality of tracks,
the record area divided into a plurality of zones depending on the radial position, each zone having an assigned base clock frequency so that an outer zone has a higher frequency than an inner zone, and blocks of
data are recorded or reproduced in each zone in accordance with the base clock of the assigned frequency, said information processing apparatus comprising:
a VFO (variable frequency oscillator) controller reproducing a VFO signal recorded on said recording medium together with data and producing a VFO clock which is synchronous with the reproduced VFO signal;
a reproduced data memory storing reproduced data, which follows the VFO signal, in response to the VFO clock; and
a controller detecting a sync-disorder of the VFO clock, and, at detection of sync-disorder, controlling storing of data in said reproduced data memory so that data reproduced from said recording medium subsequent to data reproduced during sync-disorder of said VFO clock is stored in response to the VFO clock despite the detected sync-disorder.

10. An information processing apparatus according to claim 9, wherein said controller, at detection of a sync-disorder of the VFO clock, switches a clock for addressing said reproduced data memory from the VFO clock to the base clock during storing in the reproduced data memory means of the block of data reproduced during a sync-disorder.

11. An information processing apparatus according to claim 9, wherein said controller, at detection of sync-disorder of the VFO clock, suspends storing a block of data reproduced during sync-disorder into said reproduced data memory and stores data reproduced subsequent to said block of data reproduced during a sync-disorder in a prescribed location of said reproduced data memory.

12. An information processing apparatus according to claim 9, wherein said controller monitors a difference in number of clock pulses between the VFO clock and the base clock since the beginning of storing of reproduced data for each block and detects sync-disorder of the VFO clock based on the difference.

13. An information processing apparatus according to claim 9, wherein said disc-shaped recording medium comprises a recording medium having an alternate record area which is provided for each track in an area different from a data record area for data this is recorded on each track, and wherein said apparatus further comprises a checking device checking data which is recorded in the data record area, said checking device detecting an error in the data recorded in the data record area and, at detection of sync-disorder of the VFO clock, controlling said recording means so that the block of data reproduced during a sync-disorder is recorded in said alternate area.

14. An information processing apparatus according to claim 13, wherein, during an access wait time for checking data recorded in said alternate record area, data write check for the next track or data read check after writing is carried out.

15. An information processing apparatus according to claim 9, wherein said controller, at detection of sync-disorder of the VFO clock, stores in said reproduced data memory data of a prescribed bit pattern in place of a block of data reproduced during sync-disorder of the VFO clock.

16. An information processing apparatus according to claim 9, wherein said bit pattern data includes a parity bit.

17. An optical disk storage apparatus in which
an optical disk medium having a record area formed in a plurality of tracks is rotated at a constant angular velocity,
the record area of said optical disk medium is partitioned into a plurality of zones depending on the radial position, base clock frequencies are assigned to the zones so that an outer zone has a higher frequency than an inner zone, and
an optical head signal sensor senses light beam from said optical disk medium so that blocks of data are reproduced in accordance with the base clock of the assigned frequency, said optical disk storage apparatus comprising;
a phase lock circuit which reproduces VFO signals that have been recorded on said recording medium, each VFO signal corresponding to one of the blocks of data, and which produces a VFO clock for each VFO signal which is synchronous with the reproduced VFO signal;
a memory storing reproduced data which follows the VFO signal in response to the VFO clock; and
a controller detecting sync-disorder of the VFO clock, and, at detection of sync-disorder, controlling data storing to said reproduced data memory so that reproduced data corresponding to recorded data reproduced subsequent to a block of data reproduced during sync-disorder is introduced in response to the VFO clock despite the detected sync-disorder.

18. An optical disk storage apparatus according to claim 17, wherein said controller, at detection of sync-disorder of the VFO clock, switches an introducing clock for addressing said reproduced data memory from the VFO clock to the base clock during reproduction of the block of data reproduced during a detected sync-disorder.

19. An optical disk storage apparatus according to claim 17, wherein said controller, at detection of sync-disorder of the VFO clock, suspends storing of a block of data reproduced during a detected sync-disorder into said reproduced data memory and stores data reproduced subsequent to said block of data reproduced during a detected sync-disorder in a prescribed location of said reproduced data memory.

20. An optical disk storage apparatus according to claim 17, wherein said controller monitors a difference in number of clock pulses between the VFO clock and the base clock since the beginning of storing of reproduced data for each block of data and detects sync-disorder based on the difference.

* * * * *

UNITED STATES PATENT AND TRADEMARK OFFICE
CERTIFICATE OF CORRECTION

PATENT NO. : 5,182,740
DATED : January 26, 1993
INVENTOR(S) : Takuya Mizokami, et. al.

It is certified that error appears in the above-indentified patent and that said Letters Patent is hereby corrected as shown below:

| Column | Line | |
|---|---|---|
| 8 | 58 | After "clock" change "of" to --for--. |
| 9 | 41 | After "blocks of" do not start new paragraph. |
| 10 | 4 | After "during" insert --a--. |
| 10 | 19 | Change "this" to --that--. |
| 10 | 51 | After "senses" insert --a--. |

Signed and Sealed this

Thirtieth Day of November, 1993

Attest:

BRUCE LEHMAN

*Attesting Officer*  *Commissioner of Patents and Trademarks*